Dec. 18, 1923.   1,478,104
J. W. CRAIG
DEVICE FOR PROMOTING THE COMBUSTION OF CARBON MONOXIDE GAS
Filed May 26, 1921   2 Sheets-Sheet 1
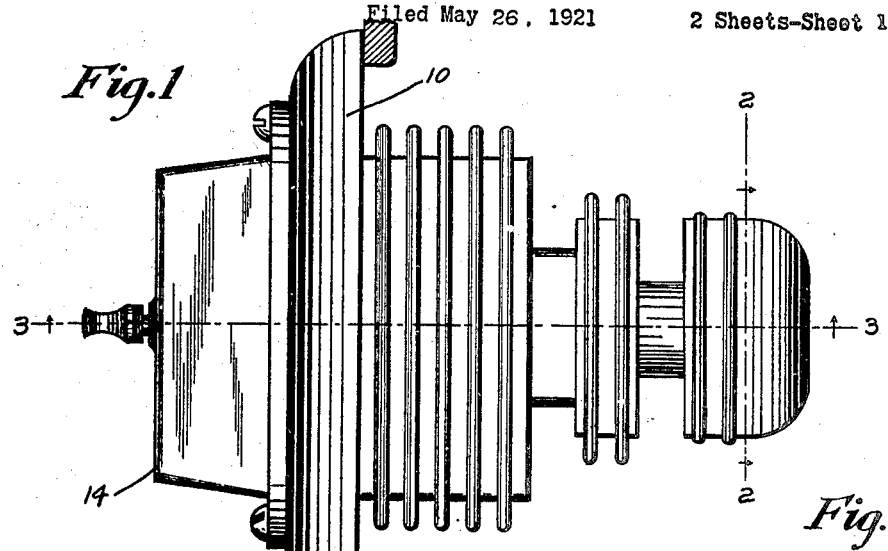
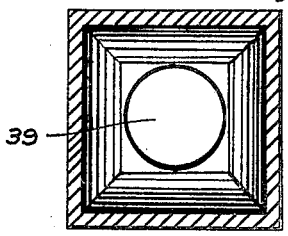
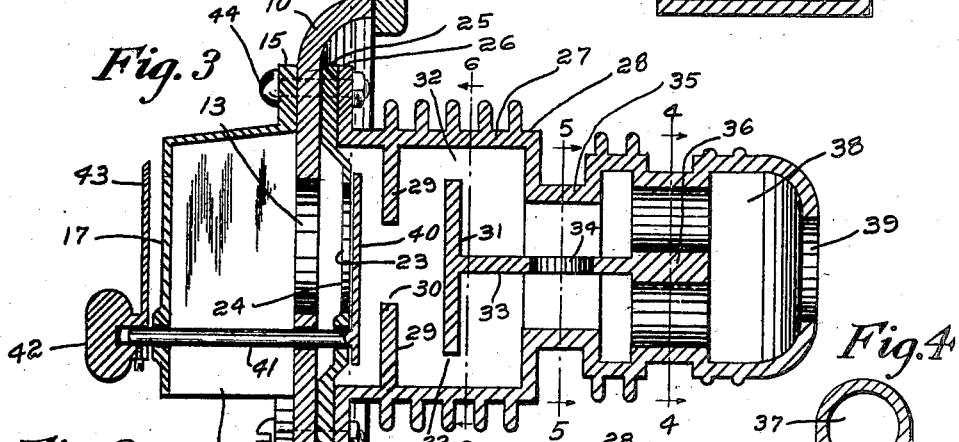
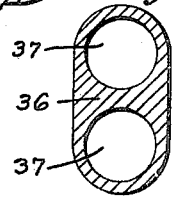
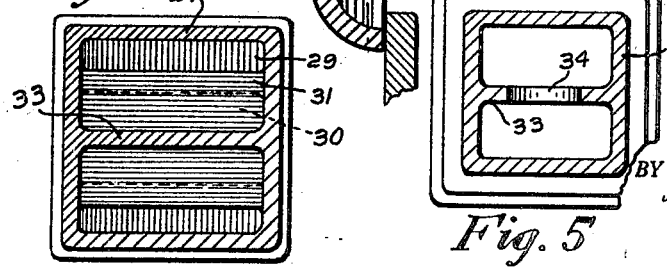
INVENTOR.
James W. Craig
BY Howard E. Barlow
ATTORNEYS.

Dec. 18, 1923.  1,478,104
J. W. CRAIG
DEVICE FOR PROMOTING THE COMBUSTION OF CARBON MONOXIDE GAS
Filed May 26, 1921   2 Sheets-Sheet 2

INVENTOR.
James W. Craig
BY
ATTORNEYS.

Patented Dec. 18, 1923.

1,478,104

UNITED STATES PATENT OFFICE.

JAMES W. CRAIG, OF PROVIDENCE, RHODE ISLAND.

DEVICE FOR PROMOTING THE COMBUSTION OF CARBON-MONOXIDE GAS.

Application filed May 26, 1921. Serial No. 472,739.

*To all whom it may concern:*

Be it known that I, JAMES W. CRAIG, a citizen of the United States, residing at Providence, in the county of Providence and State of Rhode Island, have invented certain new and useful Improvements in Devices for Promoting the Combustion of Carbon-Monoxide Gas, of which the following is a specification.

This invention relates to certain new and useful improvements in apparatus, the purpose of which is to burn the carbon monoxide gas ordinarily rising from the fuel beds of slow burning fires and which usually escapes unburnt up the chimney stack through lack of sufficient oxygen in the combustion chamber to permit complete reduction of the carbon monoxide gas to the dioxide. The device consists primarily of a heating element adapted for installation on the stoking door of a furnace and so arranged with a multiplicity of heating surfaces both within and without the door as to absorb a large amount of heat from the fire and impart same immediately to such fluids as pass through the various heating and expansion chambers of the device before it passes into the combustion chamber of the furnace itself.

The prevailing operation of the furnace however and by which the largest quantity of carbon is lost in the shape of carbon monoxide, is the following: The air, on entering from the ash-pit, gives out its oxygen to the glowing carbon on the firegrate, and generates much heat in the formation of carbon dioxide. This acid, necessarily at a very high temperature, passing upwards through the body of incandescent solid matter, takes up an additional portion of the carbon and becomes carbon monoxide. Thus, by the conversion of one volume of carbon dioxide into two volumes of carbon monoxide, heat is absorbed and the portion of carbon taken up during conversion is lost.

To merely supply oxygen to the carbon monoxide is not sufficient. If such was the case, it would only be necessary to correctly adjust the slide in any ordinary furnace door to secure complete combustion, but the temperature of the carbon monoxide must be maintained at or above 1211° Fahrenheit in order that combustion may take place. As is well known a cold draft of air introduced through the slide in a standard furnace door tends to chill the gases and cool them below the point of ignition so that large portions of the carbon monoxide gas escapes up the chimney.

The object of my invention is to provide simple and effective means by which the atmospheric air is passed through a series of heated chambers for the purpose of being heated to a high temperature and also to set up within the heating chamber a circulating or rolling motion whereby the different air particles are brought in contact with the highly heated walls; and to also set up another slow and lazy-rolling motion in the combustion chamber whereby the air will mix thoroughly with the combustible gases without appreciably decreasing the temperature of the fire box, whereby the heated oxygen thus supplied through my improved device serves to more nearly produce perfect combustion in the furnace.

With these and other objects in view, the invention consists of certain novel features of construction, as will be more fully described, and particularly pointed out in the appended claims.

In the accompanying drawings:

Figure 1 is a plan view of my improved device as connected both to the inner and outer faces of a furnace door.

Figure 2 is a cross sectional elevation on line 2—2 of Figure 1, of the air intake head.

Figure 3 is a cross sectional elevation on line 3—3 of Figure 1, showing details of inner and outer casings as assembled on a furnace door, with a control diaphragm bolted on the inner side of the door between the inner casing and the door plate.

Figure 4 is a sectional elevation on line 4—4 of Figure 3.

Figure 5 is a sectional elevation on line 5—5 of Figure 3.

Figure 6 is a sectional elevation on line 6—6 of Figure 3.

Figure 7:
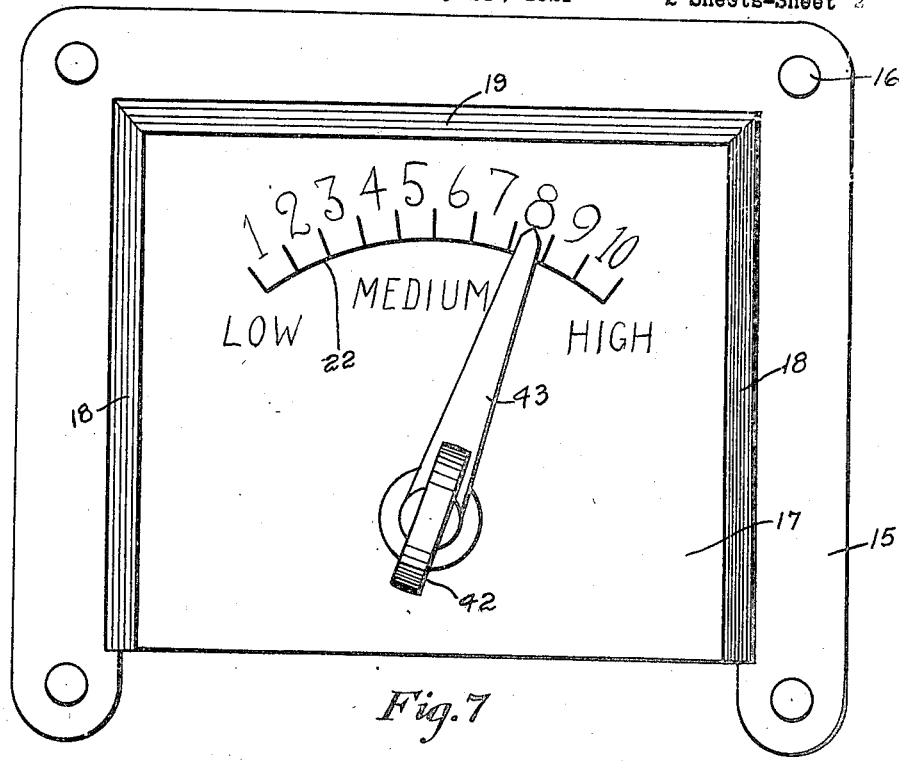
Figure 7 is a front elevation of the outside heating casing, showing the control dial and damper positioning indicator.

With reference to the drawings, 10 designates the furnace door which is mounted on hinges 11 on the body 12 of a furnace. This door is provided with a central opening 13 through it communicating with the combustion chamber within.

My invention contemplates the carrying of both an inner and an outer casing on the door, the outer casing 14 having a flange 15 about three of its sides provided with bolt holes 16, the casing proper being provided with a front wall 17, two side walls 18 and a top wall 19, the lower wall being removed leaving an opening at 20 through which the atmospheric air may enter. The front plate of this outer casing is preferably graduated and provided with an indicating pointer 43 for the purpose hereinafter described.

On the inner side of the door 10 I have mounted a diaphragm or thin plate of metal 23 having a central opening 24 through it, which opening is set to registrate with opening 13 through the door.

This diaphragm is preferably provided with an outwardly-extending flange 25 which is drilled with holes to register with the bolt holes 16 in the flange of the outer plate.

Against the inner face of this diaphragm flange rests the flange 26 of the inner casing member 27. This flange being also provided with bolt holes to register with both the holes in the diaphragm flange and flange 15 of the outer casing, whereby each bolt in passing through the door may also pass through the flanges of the inner and outer casings and that of the diaphragm, for simultaneously securing all together.

This inner casing is provided with three spaced rectangularly shaped sections connected by narrow neck portions, the first of these sections being provided with a pair of vertically disposed and inwardly projecting baffle plates 29 leaving an opening 30 between them. Spaced from these plates 29 is a baffle plate 31 which is centrally located having openings 32 at the top and bottom edges thereof for the passage of air. To the inner face of this vertically disposed baffle plate is connected a horizontal baffle plate 33 longitudinally disposed, which plate is provided with an opening 34 through it and extends through the contracted neck portion 35. Spaced from this contracted neck portion is a vertically-disposed wall 36 which is provided with two circular air passage openings 37, one above the other, which openings communicate with the collecting chamber 38 in the outer head, the extreme inner end wall of said head being provided with a circular discharge opening 39, as best illustrated in Figure 2.

The outer surface of this inner heating casing is surrounded by a plurality of spaced apart outwardly-projecting heat-absorbing ribs or fins for providing a more effective heating area to the walls of this casing.

In order to control the inflowing air through the diaphragm I have provided a shutter member 40 which is mounted on the shaft 41, the latter leading out through the wall of the door and through the outer wall 17 of the outer casing and to this shaft is connected the manipulating handle 42 and a pointer 43 whereby a movement of the pointer over the face of the dial will indicate the position of the shutter relative to the opening through the diaphragm by which construction it will be seen that this opening may be regulated to determine the amount of air which shall enter through the heating chambers to meet different conditions under which a furnace is operated.

Figure 8:
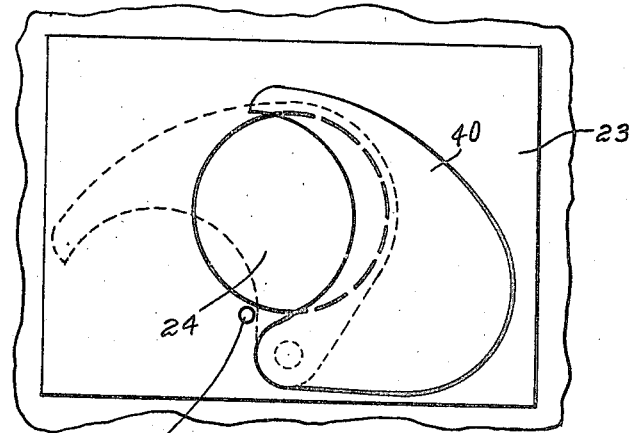
Figure 8 is a view of the inner face of the control diaphragm and shutter.

It will be noted that this diaphragm and its shutter are placed back against the door where they are protected from the extreme heat, and it will also be noted that the shutter is in somewhat of a crescent shape, in order that the orifice 24 may be uniformly enlarged or reduced by adjusting the indicator 43 as clearly shown in Figures 3, 7 and 8.

My improved combustion promoting device is very sensitive and, therefore, the shutter must be carefully adjusted for each individual plant if the maximum results are to be obtained.

Another feature of the device is that a stop pin 45 is provided so that the shutter cannot be completely closed to entirely shut off the supply of air even when handled by a careless operator, as by this construction there is always some circulation through the device if there is any draft at all in the chimney.

In the operation of my improved combustion promoting device for furnaces the same may be readily attached to both the inner and outer faces of the door by merely drilling four holes through the door through which bolts 44 may be passed to simultaneously bolt all the members together and to the door.

The shutter is then opened to admit the required amount of air which then passes through the opening 30 between the baffle plates 29, then the majority of the air being comparatively cool will pass downward through the lower opening 32 beneath the edge of the vertical baffle plate 31. Here the horizontally disposed baffle plate 33 serves to divide the inflowing air into the upper and lower strata and the upper stratum of air in the lower chamber, which is, of course, the hottest, will pass upward through the opening 34 in the plate 33, to the upper chamber, setting up an internal circulation between the lower and upper chambers so as to insure a more perfect contact of the air particles with the maximum surface of the highly heated walls of the casing a number of times during its passage through the casing chambers.

By this construction it is found that the air is heated to a high degree before being drawn into the combustion chamber over the fire thereby obtaining a maximum efficiency when united with the carbon monoxide in the combustion chamber.

The device is extremely simple and practical in construction and effective in its operation and by its use much of the heretofore wasted heat in a furnace is now utilized with consequent saving of much fuel.

The foregoing description is directed solely towards the construction illustrated, but I desire it to be understood that I reserve the privilege of resorting to all the mechanical changes to which the invention is susceptible, the invention being defined and limited only by the terms of the appended claims.

I claim:

1. In a combustion promoting device for furnaces, the combination with a door having an opening therein communicating with the combustion chamber, of an outer casing carried on the outside of the door positioned about said opening, an inner heating casing secured to the inner side of said door and having a discharge opening at its inner end, the inner side of said casing being provided with baffle plates to cause the air to take a circuitous course in passing therethrough, said inner casing being provided with three spaced chambers connected by narrow neck portions, the first of said chambers being provided with a pair of vertically disposed and inwardly projecting baffle plates spaced apart at their inner ends and having a vertical transversely disposed baffle plate arranged behind said first two baffle plates and spaced therefrom, said vertical baffle plate being spaced from the upper and lower walls of said chamber, a horizontal longitudinally disposed baffle plate extending from said vertical baffle plate through said first chamber and said second chamber, a wall between said second and third chambers to which said horizontal baffle plate is connected, said wall having openings therein communicating said second and third chambers, said horizontal baffle plate having an opening therethrough at a point between said first and second chambers, said third chamber having a discharge opening therein.

2. In a combustion promoting device for furnaces and the like, the combination with a door having an opening therein communicating with the combustion chamber, of an outer casing carried on the outside of the door and positioned about said opening, an inner heating casing secured to the inner face of said door and having an inlet opening to register with the opening in the door and a discharge opening at its opposite end, a vertical transversely disposed baffle plate in said inner casing and spaced from the inlet end and from the upper and lower walls of the latter, a vertical transversely disposed wall at and spaced from the discharge end of said inner casing, a horizontal longitudinally disposed baffle plate in said inner casing extending between said vertical baffle plate and said vertical wall dividing the inflow of air into upper and lower strata, said horizontal plate being provided with an opening, said vertical wall having openings therethrough on opposite sides of said horizontal plate.

In testimony whereof I affix my signature.

JAMES W. CRAIG.